United States Patent [19]

DeAngelis

[11] 4,271,738
[45] Jun. 9, 1981

[54] SAWING MACHINE

[76] Inventor: Eugene R. DeAngelis, Rte. 2, Box 795, Havana, Fla. 32333

[21] Appl. No.: 32,159

[22] Filed: Apr. 23, 1979

[51] Int. Cl.³ .................. B23D 53/02; B27B 13/00
[52] U.S. Cl. .................................. 83/174; 83/788; 83/820; 83/830
[58] Field of Search .............................. 83/830–834, 83/661, 174, 788, 820; 30/380–387; 299/82–84; 145/31 R

[56] References Cited

U.S. PATENT DOCUMENTS

| | | | |
|---|---|---|---|
| 2,696,228 | 12/1954 | Bowen | 30/380 |
| 2,736,352 | 2/1956 | Wright | 83/831 |
| 3,192,973 | 7/1965 | O'Link | 145/31 R |
| 3,958,332 | 5/1976 | Gates | 83/830 |
| 4,136,594 | 1/1979 | Tyler | 83/831 X |

Primary Examiner—J. M. Meister
Attorney, Agent, or Firm—Malin & Haley

[57] ABSTRACT

A powered machine for cutting hard or soft materials such as steel, wood, or the like of comparable hardness, including an endless array of truncated conical teeth affixed end-to-end, longitudinally on a common central axis, the array being disposed about at least two pulleys, at least one of which includes a circumferential recessed track shaped to receive each of the conical teeth. The cutting array is driven around the pulleys in the direction of the larger end (in diameter) of each tooth. The device is capable of cutting one or more pieces of material from any angular direction relative to the plane perpendicular to the central axis of the band of teeth. In one embodiment, the teeth are connected together by movable links which allow for replacement of an individual tooth, if required.

4 Claims, 14 Drawing Figures

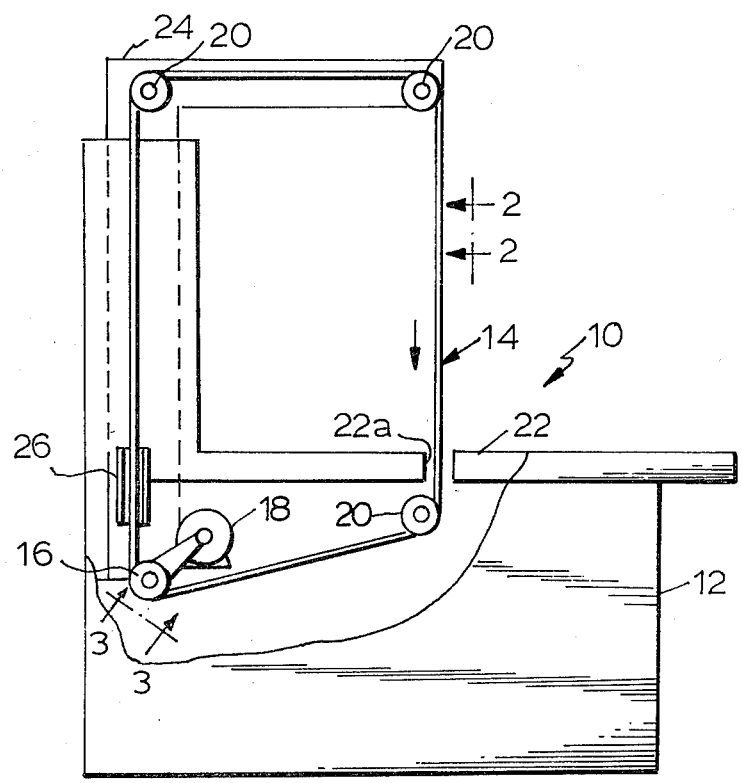
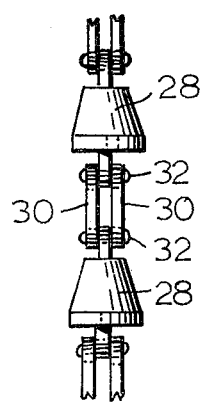 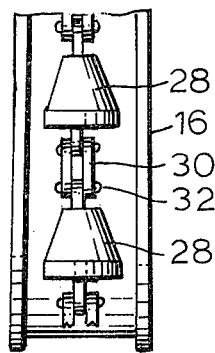 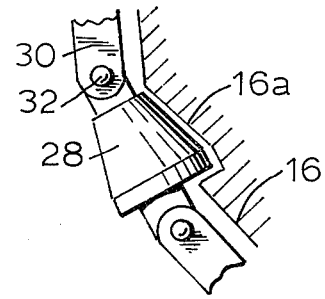
FIG.1
FIG.2  FIG.3  FIG.4

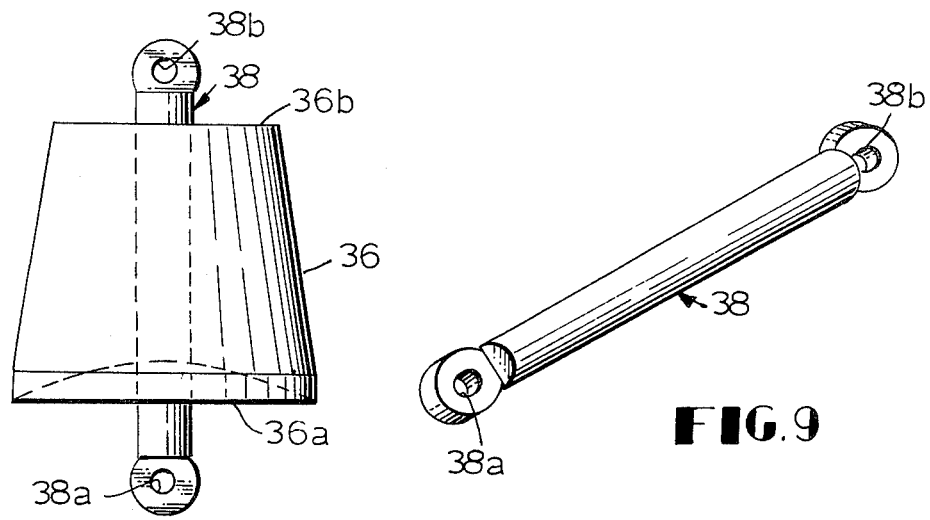
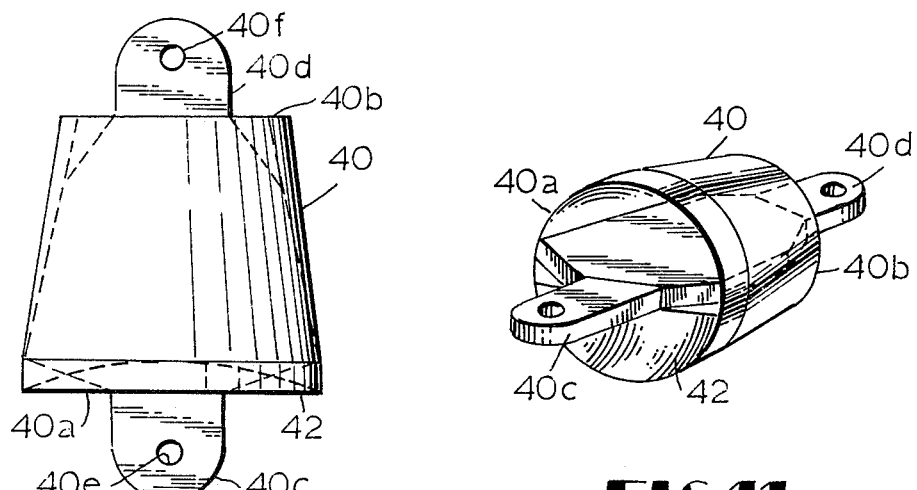
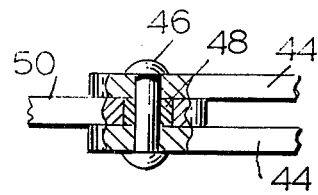

SAWING MACHINE

BACKGROUND OF THE INVENTION

This invention relates to a powered machine which is useful for cutting a variety of materials of varying hardness such as steel, wood, or plastic, and specifically to an improved powered saw having an endless band of cutting teeth which are driven around an array of pulleys such that a work piece may be cut from any position surrounding the band.

One of the limitations with a conventional band saw is that the work pieces can be directed against the band blade from only one particular direction because in such a band saw, the cutting teeth are disposed along one edge of the moving band. Another drawback with the conventional band saw is that if a tooth or teeth become broken, dull or deformed, or the band breaks, the entire band is replaced or welded. Also, slippage of the band reduces cutting efficiency.

The present invention overcomes these problems by providing a powered saw having a plurality of conically-shaped teeth joined together end to end along a common axis which allows for the engagement of the cutting teeth with a work piece or pieces from any radial direction. The present invention also provides for replacement of an individual tooth if required, for sharpening of the teeth without removing it from the pulleys, and for slippage prevention.

BRIEF DESCRIPTION OF THE INVENTION

A machine for cutting hard or soft materials comprising an endless, linked band of truncated, conically-shaped teeth disposed along a central longitudinal axis, the band being driveable around a plurality of pulleys. At least one of the pulleys (the drive pulley), includes a circumferential central track which has recessed portions shaped in size to receive individual teeth so that the pulley motivates the entire endless band of teeth without relative slippage occurring between the pulley and the band of teeth. The machine may also include a sharpening device engageably mounted in proximity to a segment of the band path to allow for sharpening of the teeth when the band of teeth is being moved.

Each tooth is constructed of a suitable hardened material adapted for cutting specific types of hard or soft materials. Each tooth has the shape of a truncated cone and includes a longitudinal, central shaft which extends beyond each end surface that allows the tooth to be connected to links. The central shaft may be formed as an integral part of each tooth. The larger diameter end surface (and especially the perimeter edge) of each tooth serves as the cutting edge of the device.

In one embodiment of the invention, each of the teeth are linked together as a chain, end-to-end, by a pair of parallel linkage members which are connected by pins to the central shafts of each tooth, there being relative movement permitted between each tooth and the linkage members so that the teeth and linkage members can move in a closed path defined by the pulleys.

The band and the pulley array are mounted on a suitable stand which normally would include a horizontally supported, rigid work platform. In one embodiment, the band moves vertically through an opening in the work surface which allows the work surface to support a work piece during the cutting operation. An electric drive motor is mounted on the supporting stand and is connected in conjunction with an emergency stop systme to prevent damage to the machine in the event of breakage of the chain blade. The drive pulley includes a plurality of recessed portions (which may be molded) that are shaped and sized to receive a portion of the band of teeth and which specifically are contoured so that the teeth and adjacent links will fit within the recesses. This will insure or prevent slippage between the band of teeth and the drive pulley during operation.

Affixed to the support stand along the band of teeth in a suitable area is a sharpening device which provides for sharpening of the teeth while the band is moving. The sharpening device is movable into contact with the moving teeth during the sharpening operation.

In operation, the cutting array is arranged in one embodiment such that it moves vertically relative to the work table so that a work piece or pieces to be cut may be horizontally supported on the work table. Because of the circular profile of the cutting teeth relative to the path of movement of the band, the work piece to be cut may be moved in contact with the cutting teeth from any radial direction when supported on the work table.

Should it become necessary, a single tooth, (or teeth) may be replaced by disengaging the linkage members on each side of the tooth, and installing a new tooth therein.

It is an object of this invention to provide an improved powered device for cutting hard or soft materials.

It is another object of this invention to provide an array of conically shaped teeth which are connected on an endless band that is useful for cutting hard or soft materials and allows for cutting of a work piece or pieces from any direction in a plane horizontal to the path of the moving teeth.

It is another object of this invention to provide an improved endless band cutting tool that includes a pulley and which allows for interlocking of the cutting band and the pulley perimeter.

But yet still another object of this invention is to provide a cutting tool employing an endless band of teeth which may be sharpened without removing the band from the device.

In accordance with these and other objects which will be apparent hereinafter, the instant invention will now be described with particular reference to the accompanying drawings.

BRIEF DESCRIPTION OF THE DRAWINGS

FIG. 1 shows a side elevational view partially cut away of one embodiment of the instant invention.

FIG. 2 shows a front elevational fragmentary view through line 2—2 of FIG. 1 showing a portion of the instant invention.

FIG. 3 shows a plan view through lines 3—3 of FIG. 1 showing a fragmentary portion of a pulley utilized in the instant invention.

FIG. 4 shows a side elevational view fragmentary in cross-section of the interlock of the pulley and one of the teeth utilized in the instant invention.

FIG. 5b shows a perspective view of the tooth shown in FIG. 5a.

FIG. 6b shows the perspective view of the tooth shown in FIG. 6a.

FIG. 8 is a top plan view of yet another embodiment showing a different tooth structure that may be used in the instant invention.

FIG. 9 shows a perspective view of the shaft utilized with the tooth shown in FIG. 8.

FIG. 10 shows a top plan view of a hollow tooth which includes a chip curl blade.

FIG. 11 shows a chip curl blade inserted in the hollow tooth in a perspective view.

FIG. 12 shows a top plan fragmentary view partially in cross-section showing a bushing inserted between the chain link arms in conjunction with the pin forming one of the connecting links in the chain.

PREFERRED EMBODIMENT OF THE INVENTION

Figure 5A:
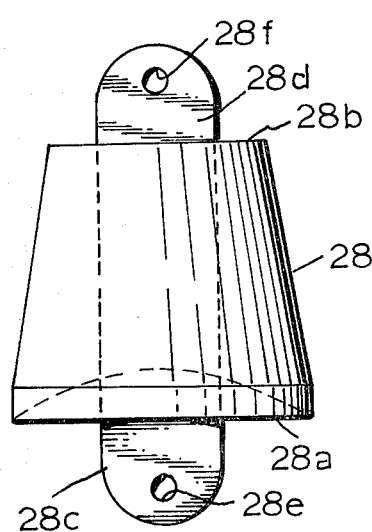
FIG. 5a shows a top plan view showing the embodiment of one tooth utilized in the instant invention.

Referring now to the drawings, and specifically FIG. 1, the instant invention is shown generally at 10 supported on a work bench 12 having a working surface 22. The invention includes an endless band in the form of a linked chain shown generally at 14 coupled about pulleys 20 and a drive pulley 16 which causes the endless chain-linked array of teeth 14 to move in the direction shown by the arrow. The chain moves through an opening 22a in the work surface. The drive pulley 16 is connected to an electric drive motor 18 supported on the inside of the work bench 12. A vertical support 24 supports the upper pulleys 20 at the desired position. A sharpening device 26 is provided adjacent a portion of the path of the endless chain 14 and is described in greater detail below.

FIG. 2 shows a fragmentary view of the cutting teeth which comprise endless chain 14 which shows teeth 28 connected together by linkage members 30 connected to pins 32 disposed through the linkage members. FIG. 3 shows a pulley 16 which is the drive pulley having teeth 28 disposed therein in recessed areas which receive at any one moment a segment of the endless chain 14. FIG. 4 shows a tooth 28 disposed within a recessed portion 16a of the drive pulley 16, showing how the tooth interlocks around the pulley circumference to prevent slippage as the drive pulley 16 is rotated by motor 18 (FIG. 1).

Figure 5B:
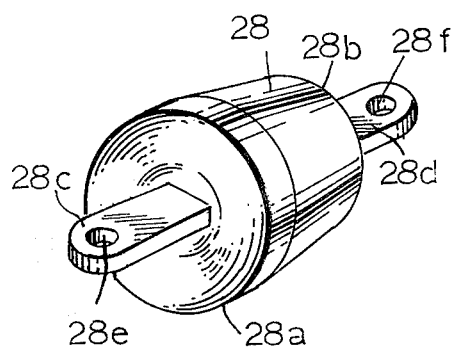

FIG. 5a shows a single tooth 28 which is conically truncated in shape including a larger end face 28a and a smaller (in diameter) end face 28b. Centrally located and projecting from the larger end face is a flat shaft 28c having an aperture 28e and from the smaller end face is a flat shaft 28d having an aperture 28f. The shafts 28c and 28d, which are centrally disposed along the conical axis, allow for connections with linking members to affix each tooth to an adjacent tooth in an endless array using chainlike linkage members. FIG. 5b shows the larger end face 28a which in essence comprises a cutting edge for each tooth.

Figure 6A:
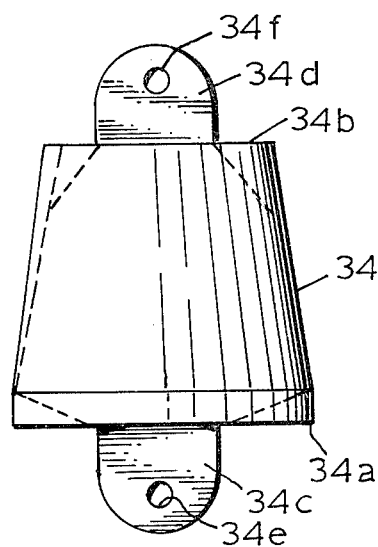
FIG. 6a shows a top plan view of a tooth utilized in an alternate embodiment of the instant invention.
Figure 6B:
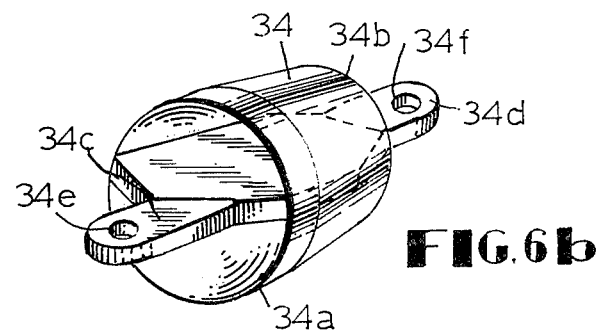

FIGS. 6a and 6b show an alternate tooth arrangement in which a portion of the tooth interior is hollow and which includes a tooth body 34 having a central flat shaft 32c disposed along the central axis terminating in shaft portion 32d. Apertures 34e and 34f allow for connection with the linkage members for linking the teeth together. Surface 34a serves as the cutting edge with the hollow space allowing for materials to pass through the teeth.

Figure 7:
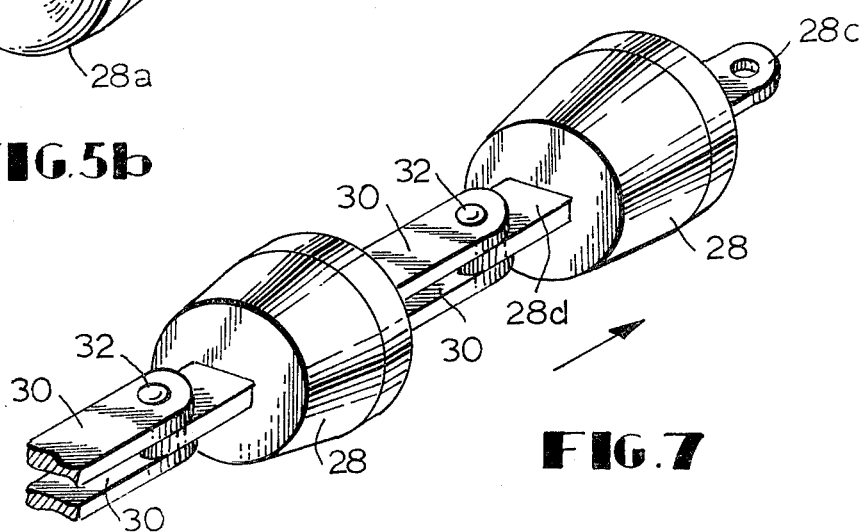
FIG. 7 shows a perspective fragmentary view of teeth and linking members utilized in the instant invention.

FIG. 7 shows the connection of teeth 28 by linkage members 30 using pins 32 to connect the linkage members 30 to a representative shaft 28d. As shown in FIG. 7, the teeth would move in the direction of the arrow for cutting, the larger end faces (and peripheral edges) engaging the material.

Referring now back to FIG. 1, because of the fact that each tooth is circular, a work piece placed on the work table surface 22 may be directed against the moving band of teeth 14 from any radial direction relative to the teeth in the plane of the work surface 22. The sharpening device 26 may be comprised of a pair of sharpening stones having surfaces shaped to engage the teeth, which when brought together engage the side leading edges of each tooth to provide for a sharpening action while the band is being moved. The sharpening stones may be positioned by conventional solenoids and appropriate control devices.

Referring now to FIG. 8, another embodiment of the invention is disclosed which shows a saw tooth 35 having a concave forward surface 36a, the perimeter of which forms the cutting blade as disclosed above. The modification in FIG. 8 includes an elongated shaft 38 disposed through the solid body of the tooth 36, the shaft having apertures at each end 38a and 38b, which are used to connect to the chain linkage itself. FIG. 9 shows a view of the shaft which may be connected by conventional means and disposed within the solid body of the tooth 36.

In one modification of the invention, a chip curl plate may be used with the hollow teeth to provide curled wood chips during the saw operation. This is accomplished as shown in FIGS. 10 and 11 by the insertion of a concave plate 42 which is sized to cover the cutting opening of a hollow tooth 40 with the chip curl plate 42 being disposed along the cutting edge 40a of the tooth. The tooth includes an interior planar shaft having a forward portion 40c and a rear portion 40d which are used to connect to the chain linkage as has been described above. With the implementation of the chip curl plate 42, the blade in conjunction with the curl plate 42 will allow curls of wood to be formed during the cutting process while still not impeding the cutting action of the entire blade.

Referring now to FIG. 12, an alternate embodiment which forms the connecting of the chain link arms to the teeth is shown which includes the chain link arms 44 connected to the shaft on the tooth shown as shaft 50 disposed between the parallel arms 42 which include a bearing or bushing surface 48 received in an aperture in the connecting shaft 50. The pin 46 holds the chain link arms 44 in the tooth connecting shaft 50 together in a moveable relationship to allow pivotal arm rotational movement relative to the tooth shaft 50 and the chain link arms 44 and pin 46.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A machine for cutting hard materials, comprising: a supporting base;
at least two pulleys connected to said supporting base; means connected to one of said pulleys for driving said pulley; and an endless array of cutting teeth joined end-to-end along a central axis to form an endless band, each of said teeth being shaped in a truncated cone, said endless array of teeth being coupled about said pulleys;

said drive pulley connected to said means for turning said drive pulley including a recessed perimeter having recessed areas sized and shaped as said conical teeth to receive said conical teeth to prevent slippage between said endless array of teeth and said pulley.

2. A machine as in claim 1, including:

means for sharpening said teeth, said sharpening means disposed on said supporting base for engagement with said teeth.

3. A machine as in claim 1, including:

a plurality of linkage members moveably connecting adjacent teeth together in an endless array, each tooth having a rigid central shaft longitudinally disposed, each shaft connected to a linkage member.

4. A cutting machine as in claim 1, wherein:

at least one of said conical teeth having a rigid plate diametrically disposed intersecting the central longitudinal axis of said tooth, said tooth having longitudinal open passages on each side of said plate from end to end on said tooth.

* * * * *